Aug. 4, 1959 F. G. STEELE 2,898,578

MAGNETIC READING APPARATUS

Filed March 7, 1955 2 Sheets-Sheet 1

FLOYD G. STEELE
INVENTOR.

BY Seymour M. Rosenberg
ATTORNEY

FLOYD G. STEELE
INVENTOR.

BY
Seymour M. Rosenberg
ATTORNEY

United States Patent Office 2,898,578

Patented Aug. 4, 1959

2,898,578

MAGNETIC READING APPARATUS

Floyd G. Steele, La Jolla, Calif., assignor to Digital Control Systems, Inc., La Jolla, Calif.

Application March 7, 1955, Serial No. 492,657

9 Claims. (Cl. 340—174)

Figure 1:
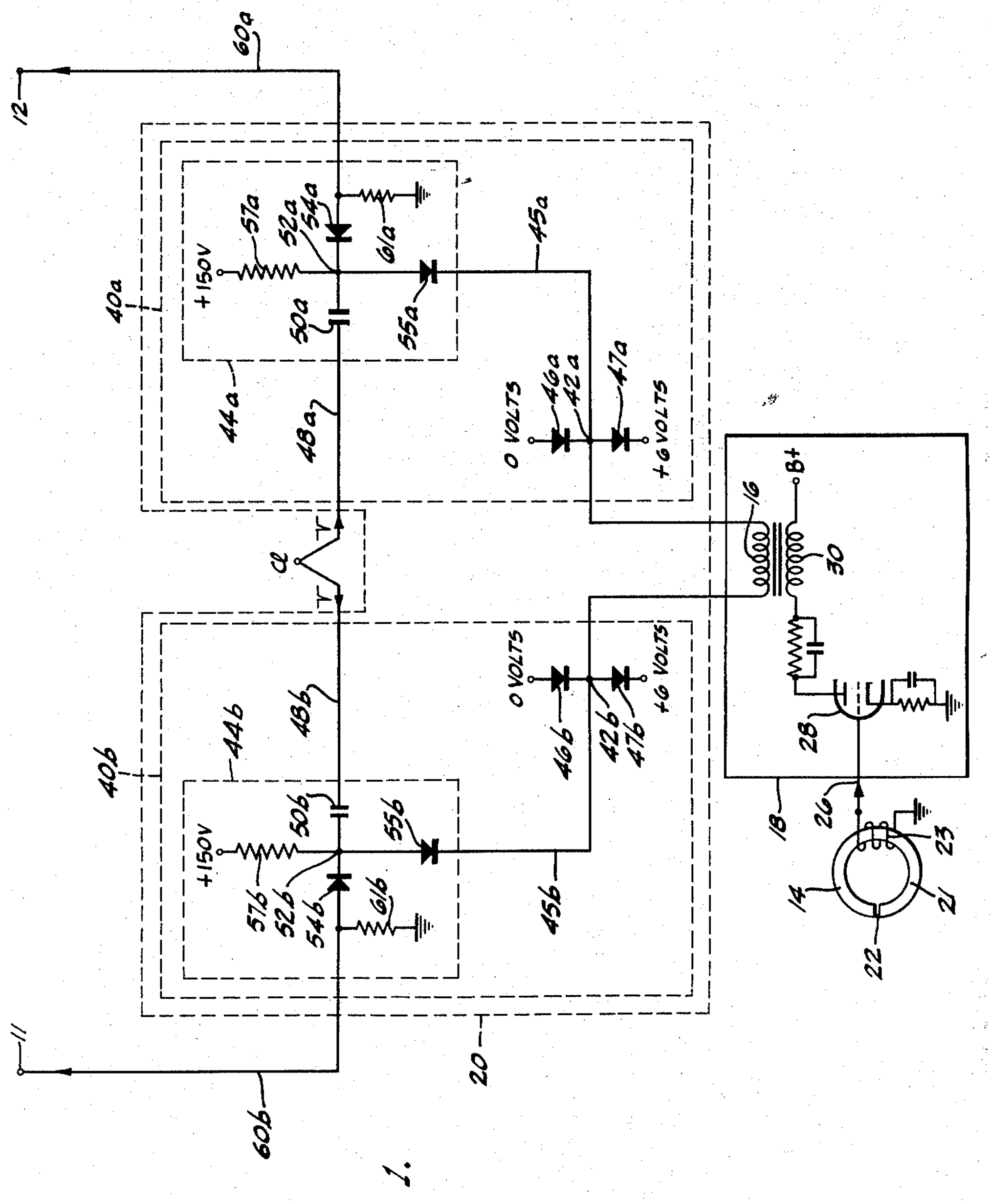

The present invention relates to a magnetic reading apparatus for producing an electrical signal representative of binary information recorded as a magnetic flux pattern on a magnetic memory channel and more particularly to a magnetic reading apparatus, for use in the electronic switching and computing arts, in selectively passing an applied timing signal to either a first or second output terminal respectively, only when the recorded magnetic flux reverses its sense of magnetization in one direction or the opposite direction.

In prior art magnetic memory apparatus, a number of different systems have been utilized for the recording of binary inforation as a magnetic flux pattern. In several of these prior art magnetic recording systems, particularly in the so-called N.R.Z. system and in the Manchester system, reversals of magnetization in the magnetic flux pattern are significant in indicating the equivalent binary information.

For example, in the N.R.Z. (Non-Return-To-Zero) system of magnetic recording, which is very widely used in the electronic switching and computing arts, a sequence of binary 1's is recorded on a magnetic memory channel as a channel region continuously magnetized in one direction while a succeeding sequence of binary 0's is recorded as an immediately succeeding channel region continuously magnetized in the opposite direction. Thus in the N.R.Z. system each reversal of magnetization in the magnetic memory channel indicates a transition between successive channel regions representing alternate binary digit values, each reversal of magnetization in one direction, for example, indicating a transition from a binary 1 to a binary 0 representing region, and each reversal of magnetization in the opposite direction indicating a transition from a binary 0 to a binary 1 representing region.

Apparatus for sensing or reading an N.R.Z. flux pattern generally employs a reading transducer which is placed adjacent a moving magnetic memory channel whereon the N.R.Z. flux pattern is recorded, the transducer producing alternate negative and positive pulses as the successive alternately directed flux reversals pass beneath the transducer.

Each negative pulse for example may indicate the beginning of a recorded sequence of binary 1's and each positive pulse may indicate the beginning of a recorded sequence of binary 0's. If each negative pulse is utilized to set a flip-flop circuit, or other two-state device, to its 1 state, and if each positive pulse is utilized to set the flip-flop circuit to its 0 representing state, then the successive voltage levels of an output signal produced by the flip-flop will correspond to and therefore reproduce the successive sequence of stored binary digits, the output signal of the flip-flop, for example, being at a high voltage level while a sequence of recorded binary 1 digits passes beneath the reading transducer, and being at a low voltage level while a sequence of binary 0's passes beneath the reading transducer.

However, a number of important functions should be accomplished by a magnetic reading apparatus in obtaining the described reproduction of magnetically stored binary digits. One prime consideration, is that generally the operation of an electronic computer or switching system is synchronized by repetitive timing signals. In order for the output signal from the flip-flop circuit to be useful in such a system, each change in the voltage level of the flip-flop output signal should take place synchronously with the arrival of timing signals.

It is therefore desirable to utilize the alternate positive and negative input signals only as control or gating signals for selectively passing the applied timing signals to either a first or second input terminal of the flip-flop, to thereby set the flip-flop to its successive states with the controlled or gated timing signals. When the flip-flop is triggered by gated timing signals in the described manner, it is clear that each change in the voltage level of the flip-flop output signal will take place synchronously with the arrival of a timing signal, the flip-flop output signal therefore being directly usable in the electronic computing or switching system.

Another desirable attribute of a magnetic reading apparatus is that it reject or be insensitive to spurious signals of reduced amplitude which may be induced into the input signal. The necessity for such a function or attribute of the magnetic reading apparatus may be readily understood: a magnetic transducer ordinarily has a single effective inductive winding in which voltage signals are produced corresponding in polarity to the directions of the successive magnetic flux reversals in an associated memory channel. Ordinarily each positive or negative voltage pulse induced in the transducer winding through flux linkage with the memory channel will be followed by a spurious voltage overshoot signal being induced by the collapse of the local magnetic field surrounding the winding. Therefore, it becomes necessary for the magnetic reading apparatus to distinguish between bona-fide input signals, which actually represent flux reversals in the recorded magnetic flux patterns, and spurious overshoot signals, of reduced amplitude, introduced into the input signal by the reading transducer or, in some cases, by succeeding amplifier stages. Ordinarily rejection of spurious overshoot signals of reduced amplitude is accomplished by clipping out the central portions of the original or amplified input signals before utilizing the input signals for the control or gating of timing signals.

In the prior art such clipping out of the central portions of the input signal has been accomplished by the removal of all signals below a predetermined voltage magnitude by means of diode rectifiers biased by precision voltage sources. Circuits of the described type have in the past caused considerable trouble because of the difficulty in maintaining the small voltage levels of the biasing sources sufficiently constant.

Another desirable, although not essential, function or attribute of a magnetic reading apparatus, is that the reading apparatus prevent the peaks of the input signal from exceeding predetermined voltage limits before utilizing the input signal for the control and gating of timing signals. Such a function of the reading apparatus is desirable because, in general, gating circuits tend to work best and may be designed for higher reliability if the control signals for the gating circuits vary between known and fixed voltage levels.

To summarize, a magnetic reading apparatus for use with N.R.Z., Manchester, or similar magnetic recording systems will generally accomplish the following functions: It will clip out or reject a central portion of the input signals to eliminate spurious signals caused by overshoots in the reading transducer or succeeding amplifier stages. It will clamp the peaks of the input signals to render the apparatus insensitive to amplitude variations in the recorded magnetic signal and it will utilize the center-clipped and peak-clamped input signals as gating or control signals for selectively passing timing signals to one or the other of a pair of output terminals.

Ordinarily the power levels of the input signals produced by a magnetic transducer are such that a single stage of amplification is insufficient to raise the power level to a point at which the amplified input signals may be utilized for the direct control of a gating circuit for selective passage of timing signals to a flip-flop. However, a single stage of amplification will be sufficient if the gate which is utilized is of the energy storage type (such as a pedestal gate) which is defined herein as a type of gate wherein a control signal is integrated or stored upon a condenser, the integrated energy of the control signal being utilized to control the gating of the timing signal.

However, in the prior art there has been a widespread belief that the combined functions, hereinbefore described, of center-clipping, peak clamping and energy storage gating could not be accomplished at the power levels available after a single stage of amplification of the input signal. Therefore in the prior art some of these functions were accomplished on the output of an initial stage of amplification while the remaining functions of the magnetic reading apparatus were accomplished on the outputs of succeeding amplifier stages. As a result prior art magnetic reading apparatuses generally comprise a series of active element amplifying or isolation stages, each stage being associated with one or more of the functions of the reading system.

The present invention, on the other hand, provides a single passive element gating network which accomplishes all of the described functions of a magnetic reading apparatus and which is operable at the power levels available after a single stage of amplification of the input signals produced by a magnetic transducer. According to the basic concept of the present invention there is provided a passive element gating network, coupled to an amplifier output winding and operable at the described power levels, for clipping out the center of amplified signals induced in the amplifier output winding and utilizing the resultant signals thus produced in gates of the energy storage type for the gating of timing signals. The gating network of the present invention eliminates a number of active elements now utilized in prior art magnetic reading apparatuses and greatly decreases the cost, both in terms of expense and of electronic complexity, of gaining access to the contents of a magnetic memory channel.

For example, with the gating network of the present invention a single twin triode vaccum tube may be utilized to maintain in operation a magnetic recirculating channel. A magnetic transducer reading head may be coupled to a single stage amplifier utilizing one triode section of the twin triode tube. A gating network of the type described may be coupled to an output winding of the single stage of amplification to provide gated timing signals to a logical flip-flop in an associated electronic switching system. Finally, a writing signal produced by the switching system may be applied to a writing amplifier, utilizing the other triode section of the twin triode tube, this writing amplifier being coupled to a recording transducer to record the writing signal on the recirculating channel.

In one preferred embodiment of the present invention a single stage amplifier receives bipolar input signals from a magnetic reading transducer and induces corresponding current signals at a substantially higher power level in an inductive output winding, each current signal corresponding in direction to the polarity of the corresponding input signal. A passive element gating network of the type hereinbefore described is coupled to the output winding and is responsive to each current signal for selectively passing an applied timing signal to one or the other of a pair of output terminals, a timing signal being passed to one output terminal only when the current signal is in one direction and exceeds a predetermined magnitude and the timing signal being passed to the other output terminal only when the current signal is in the other direction and exceeds a predetermined magnitude.

In this preferred embodiment of the present invention, the gating network comprises two substantially identical gating circuits coupled to opposite ends of the amplifier output winding, one of the gating circuits passing applied timing signals to an associated output terminal only when the current signal is in one direction and exceeds a predetermined magnitude, and the other gating circuit passing applied timing signals to the other output terminal only when the current signal is in the opposite direction and exceeds a predetermined magnitude. A single gating circuit includes a pulse pedestal gate having a control point coupled to one end of the amplifier winding, a current threshold clamping diode interconnected between the end of the winding and a relatively high voltage source, and a peak clamping diode interconnected between the end of the winding and a relatively low voltage source. The pulse pedestal gate is controlled in its operation by the gating or control voltage existing at the end of the output winding, the pulse pedestal gate passing applied timing signals only when the control voltage is low and blocking applied timing signals when the control voltage is high.

In operation, in the absence of any input signal, both ends of the output winding are normally maintained at relatively high voltage levels by their associated gating circuits, thereby blocking the passage of applied timing signals through the pulse pedestal gates of the gating circuits during these inactive periods. The ends of the winding are normally maintained at their high voltage levels by an applied predetermined threshold current, which flows through each of the threshold clamping diodes in its forward current direction, the threshold clamping diodes therefore having very low impedance and serving to directly connect the ends of the output winding to the relatively high voltage.

Whenever an input signal is received a current flow is induced in the output winding which is in one or the other direction in accordance with the polarity of the input signal. Such a current flow will tend to increase the current in one of the threshold clamping diodes thereby continuing to maintain the associated end of the winding at the relatively high voltage, but will oppose the current flow in the other current threshold clamping diode. Until the opposing current flow equals the threshold current normally flowing through the threshold clamping diode there can be no change of the high voltage level at the associated end of the winding. However, when the opposing current flow exceeds the threshold current, the threshold clamping diode can no longer remain conductive and rapidly changes to a very high impedance, the control voltage at the associated end of the winding then rapidly changing from the relatively high to a relatively low voltage in accordance with the amplitude of the input signal.

The relatively low control voltage is applied to the control point of the associated pulse pedestal gate and thereby serves to permit the passage of timing signals through the pulse pedestal gate. It is clear therefore, that in operation each of the gating circuits will pass applied timing signals only when the current flow in the winding is in a direction which is opposite to the flow of the threshold current through the associated threshold clamping diode and exceeds the predetermined magnitude of the threshold current.

The peak clamping diode in the associated gating circuit limits the negative voltage excursion of the control signal. Whenever the control signal at one end of the output winding drops to a value slightly below that of the low voltage source, the corresponding peak clamping diode becomes biased in its forward direction, the diode therefore becoming strongly conductive and serving to directly connect the end of the winding to the low voltage source. Thus in operation, the control voltage varies between fixed and definite levels, corresponding respectively to the voltage levels of the high voltage source and the low voltage source. Reliable operation of the associated pulse pedestal gate, controlled by the control signal, is therefore more easily obtained.

It should be clear in view of the foregoing that the magnetic reading apparatus of the present invention is free from the previously described disadvantages of prior art apparatus. The magnetic reading apparatus of the present invention will ordinarily utilize only a single stage of amplification, the passive element gating network of the present invention ordinarily being directly operable by current signals induced in an output winding of the amplifier stage. The passive element gating network performs all of the desired functions of center-clipping and peak clamping the amplified input signal and utilizing the resultant signals to control the gating of applied timing signals.

In addition, in performing the center clipping operation, the gating network does not require the use of precision low voltage biasing sources, since the center clipping circuit of the present invention rejects all signals below a predetermined current magnitude rather than rejecting all signals below a predetermined voltage magnitude. In the present invention therefore, a threshold current is generated to serve as a current magnitude standard for the center clipping operation. Generation of a sufficiently constant threshold current is considerably easier to accomplish than the provision of precision low voltage sources of the type used in the prior art.

It is therefore an object of the present invention to provide a magnetic reading apparatus, operable at very low power levels, for selectively passing applied timing signals to one or the other of a pair of output terminals in response to changes in magnetization of a recorded magnetic flux pattern.

It is another object of the present invention to provide a magnetic reading apparatus including an amplifier stage having an output winding and a passive element gating network coupled to the winding and responsive to current flow in the winding for passing applied timing signals to either a first or second output terminal selectively in accordance with the direction of current flow, said gating network being operable until the current flow exceeds a predetermined current magnitude.

It is yet another object of the invention to provide, in a magnetic reading apparatus, a passive element gating network coupled to an output winding of an amplifier stage, operable at very low power levels, and including a first passive element gating circuit for passing an applied timing signal to a first output terminal only when the current flow in the winding is in one direction and exceeds a predetermined magnitude and a second passive element gating circuit for passing the applied timing signal to a second output terminal only when the current flow in the winding is in the other direction and exceeds the predetermined magnitude.

It is still another object of the invention to provide, in a magnetic reading apparatus, a pair of passive element gating circuits coupled to opposite ends of an amplifier output winding, each gating circuit including a threshold clamping means for normally maintaining a control voltage at the associated end of the winding at a predetermined level, each threshold clamping means being rendered inoperable whenever current flow in said winding is in a predetermined direction and exceeds a predetermined magnitude, each gating circuit also including a pulse pedestal gate responsive to the control voltage for passing an applied timing signal only when the control voltage is not at the predetermined level.

It is still a further object of the invention to provide, in a magnetic reading apparatus, a pair of passive element gating circuits coupled to opposite ends of an amplifier output winding, each gating circuit including, a pulse pedestal gate controlled by the voltage signal existing at the associated end of the output winding, and a threshold clamping diode through which an applied predetermined threshold current normally flows to render the diode conductive and thereby connect the end of the winding with a source of voltage at a level appropriate for preventing passage of timing signals through the pulse pedestal gate, the gating circuit only passing timing signals when a current flow is induced in the output winding which is opposite in direction to the threshold current and exceeds the magnitude of the threshold current.

The novel features which are believed to be characteristic of the invention, both as to its organization and mode of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

Figure 2A:
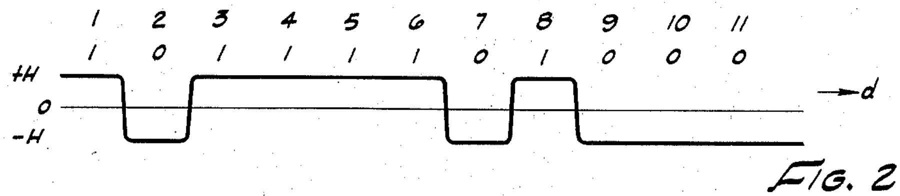
Figure 2B:
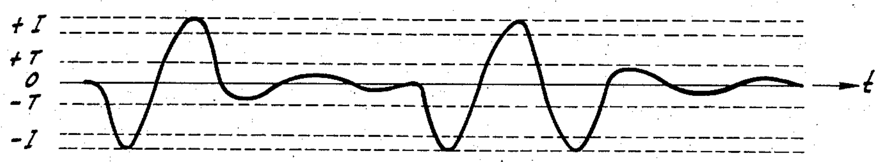

Fig. 1 is a partly block, partly circuit diagram illustrating a preferred embodiment of the present invention;

Fig. 2*a* is a graph illustrating a magnetic flux pattern recorded on a magnetic memory channel;

Fig. 2*b* is a graph illustrating a current waveform induced in an output winding of an amplifier associated with the magnetic reading apparatus of the present invention, during reading of the magnetic flux pattern shown in Fig. 2*a*; and Figs. 2*c* through 2*g* are graphs illustrating voltage waveforms appearing at a number of points in the magnetic reading apparatus during reading of the magnetic flux pattern shown in Fig. 2*a*.

Referring now to the drawings, there is shown in Fig. 1, a preferred embodiment, according to the present invention of a reading apparatus responsive to changes of magnetization, in a magnetic flux pattern recorded on a magnetic memory channel, for selectively passing an applied pulse timing signal C1 to either a first output terminal 11 or a second output terminal 12, respectively, only when the recorded magnetic flux changes its sense of magnetization in one direction or the other direction.

According to the basic concept of the invention, the magnetic reading apparatus shown in Fig. 1, may comprise three elements, namely: a magnetic reading transducer 14, for producing a voltage signal in response to each successive reversal of magnetization in a magnetic flux pattern recorded on an adjacent moving magnetic memory channel (not shown), the polarity of each voltage signal corresponding to the direction of the reversal of magnetization; an amplifier 18 having an output winding 16, and responsive to each voltage signal for inducing in winding 16 a resultant current flow, corresponding respectively in direction and amplitude to the polarity and magnitude of the voltage signal; and a passive element gating network 20 responsive to the current flows induced in winding 16 for selectively passing an applied timing signal C1 to terminal 11 or terminal 12, network 20 passing timing signal C1 to terminal 11 only when the current flow in winding 16 is in one direction and exceeds a predetermined magnitude and passing signal C1 to terminal 12 only when the current flow is in the opposite direction and exceeds a predetermined magnitude.

As shown in Fig. 1, reading transducer 14 may be a conventional C-shaped magnetic core 21 having an effective winding 23 in which a voltage signal is induced in response to each change of magnetization in the magnetic flux pattern moving beneath a gap 22 in core 21. The voltage signals induced in winding 23 are applied over a conductor 26 to the input of amplifier 18, which, as shown in Fig. 1, may comprise a single stage amplifier utilizing a single triode section 28 of a twin triode vacuum tube, the voltage input signals being applied to the grid of triode section 28 to cause corresponding amplified output signals to appear across a load inductor 30 in the plate circuit of amplifier 18. Load inductor 30 is electromagnetically coupled to output winding 16 to induce current flows, in winding 16, corresponding in direction and magnitude respectively to the polarity and magnitude of the voltage signals applied to the input of amplifier 18.

As shown in Fig. 1, gating network 20 may comprise a pair of substantially identical gating circuits 40*a* and 40*b* coupled to opposite ends of winding 16. The following description will be largely directed to the structure of gating circuit 40*a*, as being representative of the structure of both gating circuits. Corresponding elements of the two gating circuits will be similarly numbered, varying only in the use of the postscript "*a*" or "*b*" for the designation of corresponding elements of gating circuits 40*a* or 40*b*, respectively.

Within gating circuit 40*a*, one end of winding 16 is connected to a control terminal 42*a* which serves as a control point for a pulse pedestal gate 44*a*, control terminal 42*a* being connected to a control input of gate 44*a* by a conductor 45*a*. As will be shown hereinafter, pulse pedestal gate 44*a* is controlled in its operation by the gating or control voltage existing at control terminal 42*a*, gate 44*a* passing applied timing pulses C1 to output terminal 12 only when an appropriate control voltage exists at terminal 42*a*.

Terminal 42*a* is connected to the cathode of a peak clamping diode 46*a* whose anode is connected to a source of 0-volts. A threshold clamping diode 47*a* is intercoupled between terminal 42*a* and a source of +6 volts, the anode of diode 47*a* being connected to the terminal 42*a* and the cathode of the diode being connected to the source of +6 volts.

Referring now to pulse pedestal gate 44*a*, as shown in Fig. 1, a source, not shown, of timing pulses C1 is connected by a conductor 48*a* to a pulse input of gate 44*a*, conductor 48*a* being connected to one electrode of a condenser 50*a*, the other electrode of condenser 50*a* being connected to a gate terminal 52*a*. Gate terminal 52*a* is connected to the cathode of a gating diode 54*a*, the anode of an isolation diode 55*a* and to one end of a resistor 57*a* whose other end is connected to a source of +150 volts. The cathode of isolation diode 55*a* is connected by conductor 45*a* to control terminal 42*a* while the anode of gating diode 54*a* is connected by an output conductor 60*a* to output terminal 12. A resistor 61*a* is intercoupled between conductor 60*a* and a source of ground potential.

Description of the structure of gating circuit 40*a* has now been completed. Gating circuit 40*b* is substantially identical to circuit 40*a*, varying principally in that its control terminal 42*b* is connected to the opposite end of winding 16 while its output conductor 60*b* is connected to output terminal 11. Turning now to a consideration of the operation of the preferred embodiment of the magnetic reading apparatus shown in Fig. 1 and referring particularly to the illustrative graphs of magnetic flux, voltage, and current waveforms which are shown in Figs. 2*a* through 2*g*, it will be assumed in the following description of operation that a particular sequence of 11 binary digits, the sequence 10111101000 has been recorded as an N.R.Z. magnetic flux pattern in the magnetic memory channel and is being read by the magnetic reading apparatus of the present invention.

It will be recalled that in the N.R.Z. system of magnetic recording, a binary 1 or a sequence of binary 1's is recorded on the magnetic memory channel as a region continuously magnetized in one direction, while a succeeding binary 0 or sequence of binary 0's is recorded as a region continuously magnetized in the opposite direction. Thus in the N.R.Z. system a reversal of magnetization in one direction may indicate a transition from a binary 1 to a binary 0 representing region, while a reversal of magnetization in the opposite direction may indicate a transition from a binary 0 to a binary 1 representing region.

Fig. 2*a* is a graph plotting magnetic flux intensity against distance *d* along the memory channel for a section of the memory channel in which is recorded the successive digits (numbered 1 to 11) of the described binary digit sequence 10111101000. As shown in Fig. 2*a*, a binary 1 or sequence of binary 1's is recorded as a channel region with a magnetization or flux density of +H, while a binary 0 or sequence of binary 0's is recorded as a channel region with a magnetization or flux density of —H (where +H and —H are values of flux density corresponding to magnetic saturation in one direction or the other direction of the surface of the memory channel). Thus the waveform shown in Fig. 2*a* is representative of the magnetic flux pattern recorded on the magnetic medium.

In operation, as the magnetic flux pattern illustrated in Fig. 2*a* moves beneath reading gap 22 of magnetic transducer 14, a voltage signal is induced in the transducer output winding 23 for each reversal of magnetization in the magnetic flux pattern, the polarity of each voltage signal corresponding to the direction of reversal in the magnetic flux pattern. This voltage signal is applied to amplifier 18 which induces corresponding current signals, at substantially higher power levels, in its output winding 16. Fig. 2*b* is a graph plotting the amplitude of the induced current signal against time, the time scale being selected so as to show the correspondence between the induced current signal and the magnetic flux pattern shown in Fig. 2*a*.

It is clear, from a consideration of Figs. 2*a* and 2*b*, that, for the preferred embodiment of the invention shown in Fig. 2, each reversal of magnetization representing a change from a binary 1 to a binary 0 causes a current flow in one direction while each reversal of magnetization representing a change from a binary 0 to a binary 1 causes a current flow in the opposite direction. Thus, for example, the reversal of magnetization between the first digit (a binary 1) and the second digit (a binary 0) of the recorded sequence of binary digits 10111101000, causes a current flow in winding 16 of —I milliamperes, while the succeeding reversal of magnetization between the second and third binary digits (binary 0 to binary 1) causes a current flow of +I milliamperes.

Ideally, current flows should not be induced in winding 16 during the time intervals corresponding to the 3rd, 4th, 5th and 6th binary digits (a sequence of binary 1's) since there are no reversals of magnetization during these periods. However, as explained hereinbefore, overshoot signals in the transducer output winding and other circuit effects, cause spurious current flows of reduced amplitude during these intervals, as shown in Fig. 2*b*. In a similar manner spurious current flows are also formed during the time intervals corresponding to the 9th, 10th, and 11th binary digits (a sequence of binary 0's).

The spurious current flows in winding 16, as may be seen in Fig. 2*b*, may have either current direction. However, the spurious current flows are of reduced amplitude, never exceeding in magnitude a predetermined threshold current of T milliamperes, as illustrated in Fig. 2*b*. Therefore, the effects of spurious current signals may be eliminated by providing that the gating network 20, which is coupled to winding 16, shall be insensitive to current flows between +T and —T milliamperes, the gating network thus rejecting or clipping-out the central portions of each current flow and being inoperable for the passage of the applied timing signals C1 until the current flow in winding 16 exceeds the predetermined threshold current.

The manner in which the center-clipping operation is accomplished will become clear during the following description of the operation of gating network 20. As explained hereinbefore, network 20 comprises the pair of gating circuits 44*a* and 44*b* coupled to opposite ends of output winding 16, each of the gating circuits including a pulse pedestal gate for the gating of the applied timing signals C1 under the control of the voltage signal existing at a control terminal connected to the associated end of output winding 16. In gating circuit 40*a*, for example, pulse pedestal gate 44*a* is controlled in its operation by the voltage signal existing at control terminal 42*a*.

Within gate 44*a*, resistor 57*a* has a predetermined magnitude such that in the absence of an induced current flow in winding 16, the predetermined threshold current T normally flows from the high voltage source (+150 volts) through the resistor and through diodes 55*a* and 47*a*, in their forward current direction, to the source of +6 volts connected to the cathode of diode 47*a*. However, when current is flowing through diode 47*a* in its forward direction, the diode will of course have very low impedance, and therefore, in the absence of induced current flow in winding 16, the voltage at control terminal 42*a* will be substantially equal to +6 volts. In the same manner the control voltage at terminal 42*b* is normally maintained at +6 volts in the absence of an input signal by current flowing from resistor 57*b* through diode 47*b*.

Whenever an input signal is received by amplifier 18, a current flow is induced in output winding 16 which is in one direction or the other direction in accordance with the polarity of the input signal. Such a current flow will tend to increase the current flowing through one of the threshold clamping diodes 47*a* or 47*b*, thereby continuing to maintain the voltage at the associated control terminal 42*a* or 42*b* at +6 volts, while at the same time opposing the current flow in the other threshold clamping diode.

For example, a negative current flow in winding 16, directed from control terminal 42*a* to control terminal 42*b*, tends to increase the current flowing through diode 47*b* while at the same time, opposing or decreasing the current flowing through diode 47*a*, thereby tending to maintain terminal 42*b* at +6 volts while also tending to decrease the voltage at terminal 42*a*. However there can be no significant change of the +6 volt level at terminal 42*a* until the opposing current flow exceeds the threshold current T normally flowing through diode 47*a*. At that time, diode 47*a* can no longer remain conductive and rapidly changes to a very high impedance, the control voltage at terminal 42*a* therefore rapidly dropping below +6 volts in accordance with the amplitude of the input signal. The peak clamping diode 46*a* is provided to limit the negative voltage excursion of the control signals at terminal 42*a*, diode 46*a* becoming highly conductive whenever the control voltage drops to 0 volts, thus connecting terminal 42*a* to the source of 0 volts and thereby preventing any further decrease of the control signal.

Figure 2C:
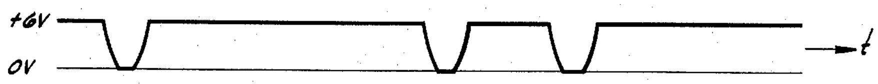
Figure 2D:
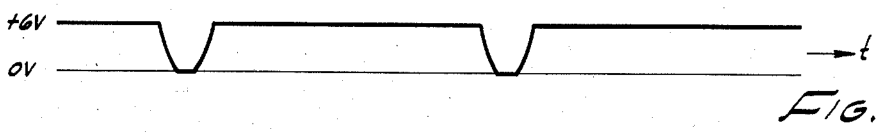

From the foregoing, it is clear that the control voltage at terminal 42*a* is normally at +6 volts, dropping below +6 volts only when the current flow in winding 16 is negative and exceeds in magnitude the predetermined threshold current of —T milliamperes, each negative voltage excursion of the control signal being clamped so as not to drop below 0 volts. Conversely, the control voltage at terminal 42*b* will drop below its normal value of +6 volts only when the current flow in winding 16 is positive and exceeds +T milliamperes. Fig. 2*c* illustrates, by way of example, the waveform of a control voltage produced at terminal 42*a* by the current waveform shown in Fig. 2*b* while Fig. 2*d* illustrates the control signal produced at control terminal 42*b* by the same current waveform.

It will be remembered that the control signals existing at terminals 42*a* and 42*b* are effective for gating or controlling the passage of timing signals C1 through gates 44*a* and 44*b*, respectively. For example, referring to gate 44*a*, timing signals C1 are blocked by the gate when the control voltage at terminal 42*a* is at its normally high level (+6 volts), timing signals being passed through the gate only when the control voltage at terminal 42*a* drops below +6 volts in response to a negative current flow in winding 16, passage of timing signals being preferably effected when the control voltage is at its lowest level (0 volts).

Within gate 44*a*, the voltage existing at gate terminal 52*a* and at the cathode of gating diode 54*a* will normally be the same as the voltage at control terminal 42*a*, since isolation diode 55*a* is normally conductive, because of the threshold current flowing through the diode, the diode thereby directly connecting terminals 42*a* and 52*a*.

Thus when the control voltage is at +6 volts, the voltage at the cathode of gating diode 54*a* will also be at +6 volts thereby biasing gating diode 54*a* in its nonconductive direction by 6 volts. If it be assumed that the negative pulses of the applied timing signal C1 do not exceed 6 volts in magnitude, then it is clear that the application of timing signal C1 through capacitor 50*a* can only cause the voltage at the cathode of diode 54*a* to drop from +6 volts to 0 volts, gating diode 54*a* therefore never becoming conductive and thereby blocking the passage of timing signals C1.

However when the control voltage is at 0 volts, the application of timing signal C1 will cause the voltage at the cathode of diode 54*a* to drop from 0 volts to —6 volts, thus biasing gating diode 54*a* in its forward direction and causing the diode to become conductive to thereby pass the applied timing signal to output terminal 12.

It should be noted, in connection with the operation of gate 44*a*, that each negative pulse of the applied timing signal C1, drops the voltage at the anode of isolation diode 55*a* below the voltage level existing at its cathode, thereby causing isolation diode 55*a* to become non-conductive and to thereby disconnect gate 44*a* from the control voltage at terminal 42*a* for the duration of the applied timing signal. Thus it is clear that, during the application of a negative pulse, no energy is drawn from the source of control voltage, passage or blocking of timing pulses being instead controlled by energy previously stored or integrated over a period of time in capacitor 50*a* by the source of control voltage. It thereby becomes possible, because of the use of an energy storage gate of the described type, to supply the control voltage at very high impedance levels and still succeed in passing or blocking timing signals supplied from a relatively low impedance source.

An energy storage gate of the described type, such as gate 44*a*, is commonly called a pulse pedestal gate, so called because the control voltage sets a voltage level or pedestal, at one electrode of a gating element, on which is superimposed or added a voltage excursion corresponding to an applied pulse, the pulse being passed or blocked by the gating element in accordance with the algebraic sum of the voltage pedestal and the pulse voltage excursion. For example, in the operation of gate 44*a*, when the control voltage (pedestal voltage) is +6 volts, then, since the applied timing signal pulse has a —6 volt voltage excursion (pulse voltage excursion), the algebraic sum of the pedestal voltage and the pulse voltage is 0 volts and the applied pulse is entirely blocked. However, when the pedestal is 0 volts, the algebraic sum of the pedestal voltage and the pulse voltage is —6 volts, and the applied pulse is entirely passed.

Figure 2E:
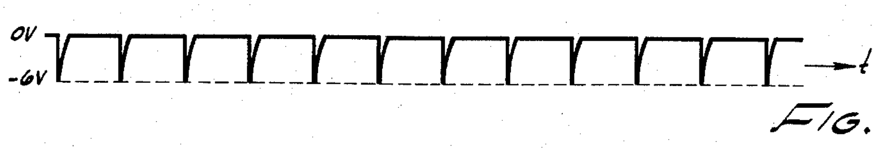
Figure 2F:
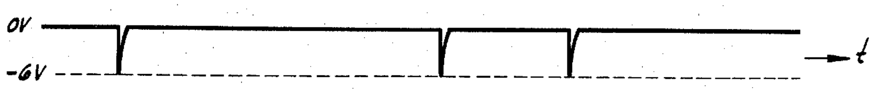

In Fig. 2*e*, there is shown the waveforms of typical timing signals C1, the successive negative pulses of signals C1 having a magnitude of approximately —6 volts. Fig. 2*f* illustrates the waveform of three timing signals C1 passed to terminal 12 by gate 44*a* when the control voltage at terminal 42*a* corresponds to the waveform shown in Fig. 2*c*. As shown in Fig. 2*f*, timing signals C1 are passed to terminal 12 by gate 44*a*, only when the control voltage, shown in Fig. 2*c*, drops to its low level, each passage of a timing signal C1 therefore corresponding to a negative current flow in winding 16, as shown in Fig. 2*c*, and to a flux reversal from +H to —H in the recorded magnetic flux pattern shown in Fig. 2*a*.

Figure 2G:
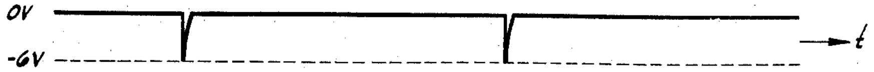

Referring to Fig. 2*g* there is shown a waveform of two timing signals C1 passed by gate 44*b* to terminal 11 under the control of the voltage waveform at terminal 42*b*, as shown in Fig. 2*d*. It is clear that timing signals C1 are passed to terminal 11 by gate 44*b* only when the control voltage at terminal 42*b* drops to its low level in response to positive current flow in winding 16, each negative pulse applied to terminal 11 therefore corresponding to a flux reversal from —H to +H in the recorded magnetic flux pattern shown in Fig. 2*a*.

Detailed description of the operation of the magnetic reading apparatus shown in Fig. 1 has now been completed. To summarize the overall operation of the magnetic reading apparatus shown in Fig. 1, the reading apparatus is responsive to the magnetic flux pattern recorded on the moving magnetic memory channel for selectively passing applied timing signals C1 either to output terminal 12 or output terminal 11 in accordance with each consecutive change in the sense of magnetization of the magnetic flux pattern, the apparatus passing the timing signals C1 to output terminal 12 only when the recorded magnetic flux changes in one direction, from +H to —H and passing the timing signal C1 to output terminal 11 only when the recorded magnetic flux changes in the other direction from —H to +H.

What is claimed as new is:

1. In a magnetic reading device for selectively passing an applied timing signal to either a first or second output terminal respectively, in accordance with each reversal of magnetization in a magnetic flux pattern recorded on a movable magnetic memory channel, a magnetic reading apparatus comprising: a magnetic reading transducer positioned adjacent the memory channel and responsive to each reversal of magnetization in the magnetic flux pattern for producing a voltage signal corresponding in polarity to the direction of reversal; an amplifier, having an output winding and responsive to each voltage signal for inducing in said winding a current flow corresponding in direction to the polarity of the voltage signal; and a passive element gating network connected to said winding and responsive to each current flow for passing the applied timing signal to the first or second output terminal selectively in accordance with the direction of the current flow, said gating network passing the timing signal to the first output terminal only when the current flow is in one direction and exceeds a first predetermined magnitude and passing the timing signal to the second output terminal only when the current flow is in the opposite direction and exceeds a second predetermined magnitude.

2. The magnetic reading apparatus defined by claim 1 wherein said gating network comprises first and second passive element gating circuits, said first gating circuit being connected to one end of said winding and being responsive to each current flow in the one direction for passing the applied timing signal to the first output terminal only when the current flow exceeds the first predetermined magnitude, and said second gating circuit being connected to the opposite end of said winding and being responsive to each current flow in the opposite direction for passing the applied timing signal to the second output terminal only when the current flow exceeds the second predetermined magnitude.

3. The magnetic reading apparatus defined by claim 2 wherein said first gating circuit includes a current threshold clamping diode interconnected between the one end of said winding and a source of predetermined voltage potential, a pulse pedestal gate connected to the one end of said winding and including means for producing a predetermined threshold current and for applying the predetermined threshold current to the one end of said winding to bias said diode in its forward current direction thereby rendering the diode conductive and directly coupling the one end of said winding to the source of predetermined voltage potential, said pulse pedestal gate having an output terminal and being responsive to the voltage at the one end of said winding for passing the applied timing signal to the output terminal only when the voltage is not at the predetermined potential whereby said pulse pedestal gate passes applied timing signals only when a current flow is induced in said winding which exceeds the threshold current in magnitude and which is in a direction opposing the flow of the threshold current through said diode.

4. The magnetic reading apparatus defined by claim 2 wherein said first gating circuit includes a first threshold clamping means connected to the one end of said winding and normally operable for maintaining a first gating signal having a first predetermined voltage level at the one end of said winding, said first threshold clamping means being rendered inoperable in response to current flow in said winding whenever the current flow is in said first direction and exceeds the first predetermined magnitude, and also includes a first pulse pedestal gate connected to the one end of said winding and responsive to the first gating signal for passing the applied timing signal to the first output terminal only when the first gating signal is not at the first predetermined level.

5. The magnetic reading apparatus defined by claim 4 wherein said second gating circuit includes a second threshold clamping means connected to the opposite end of said winding and normally operable for maintaining a second gating signal having a second predetermined voltage level at the opposite end of said winding, said second threshold clamping means being rendered inoperable in response to current flow in said winding whenever the current flow is in said opposite direction and exceeds the second predetermined magnitude, and also includes a second pulse pedestal gate connected to the opposite end of said winding and responsive to the second gating signal for passing the applied timing signal only when the second gating signal is not at the second predetermined level.

6. In a magnetic reading apparatus for producing electrical output signals respectively representative of successive changes in magnetization in a magnetic flux pattern recorded on a magnetic memory channel, the combination comprising: an inductive winding; means electromagnetically coupled to said inductive winding for inducing in said winding successive bidirectional electrical current flows respectively representative of the successive changes in magnetization in the recorded magnetic flux pattern; a first passive element gating circuit electrically connected to said winding, having a first output terminal and being operable in response to each current flow in one direction for passing an applied pulse signal to said first output terminal; and a second passive element gating circuit, electrically connected to said winding, having a second output terminal and being operable in response to each current flow in the opposite direction for passing an applied pulse signal to said second output terminal.

7. The combination defined by claim 6 wherein said first gating circuit is connected to one end of said winding, said first gating circuit including a first threshold clamping means connected to the one end of said winding and normally operable for applying a first gating signal having a first predetermined voltage level to the one end of said winding, said first threshold clamping means being rendered inoperable in response to current flow in said winding whenever the current flow is in the one direction and exceeds a first predetermined magnitude, and also includes a first energy storage gate connected to the one end of said winding and responsive to the first gating signal for passing an applied pulse signal to the first output terminal only when the first gating signal is not at the first predetermined level.

8. The combination defined by claim 7 wherein said second gating circuit is substantially identical in structure to said first gating circuit, said second gating circuit being connected to a separate end of said winding remote from the one end of said winding.

9. The combination defined by claim 6 wherein said first gating circuit includes a current threshold clamping diode interconnected between one end of said winding and a source of predetermined voltage potential, and also includes an energy storage gate connected to the one end of said winding and having means for producing a predetermined threshold current and for applying the predetermined threshold current to the one end of said winding to bias said diode in its forward current direction thereby rendering the diode conductive and directly coupling the one end of said winding to the source of predetermined voltage potential, said energy storage gate having an output terminal and being responsive to the voltage at the one end of said winding for passing the applied timing signal to said first output terminal only when a current flow is induced in said winding which exceeds the threshold current in magnitude and which is in a direction opposing the flow of the threshold current through said diode.

References Cited in the file of this patent

UNITED STATES PATENTS 2,611,025 Jankowski ---------------- Sept. 16, 1952
2,698,427 Steele ------------------- Dec. 28, 1954
2,734,186 Williams ----------------- Feb. 7, 1956